June 3, 1930.  F. W. GAY  1,761,387
HEAT TRANSFER MEANS FOR ELECTRICAL APPARATUS
Filed March 13, 1928  4 Sheets-Sheet 1
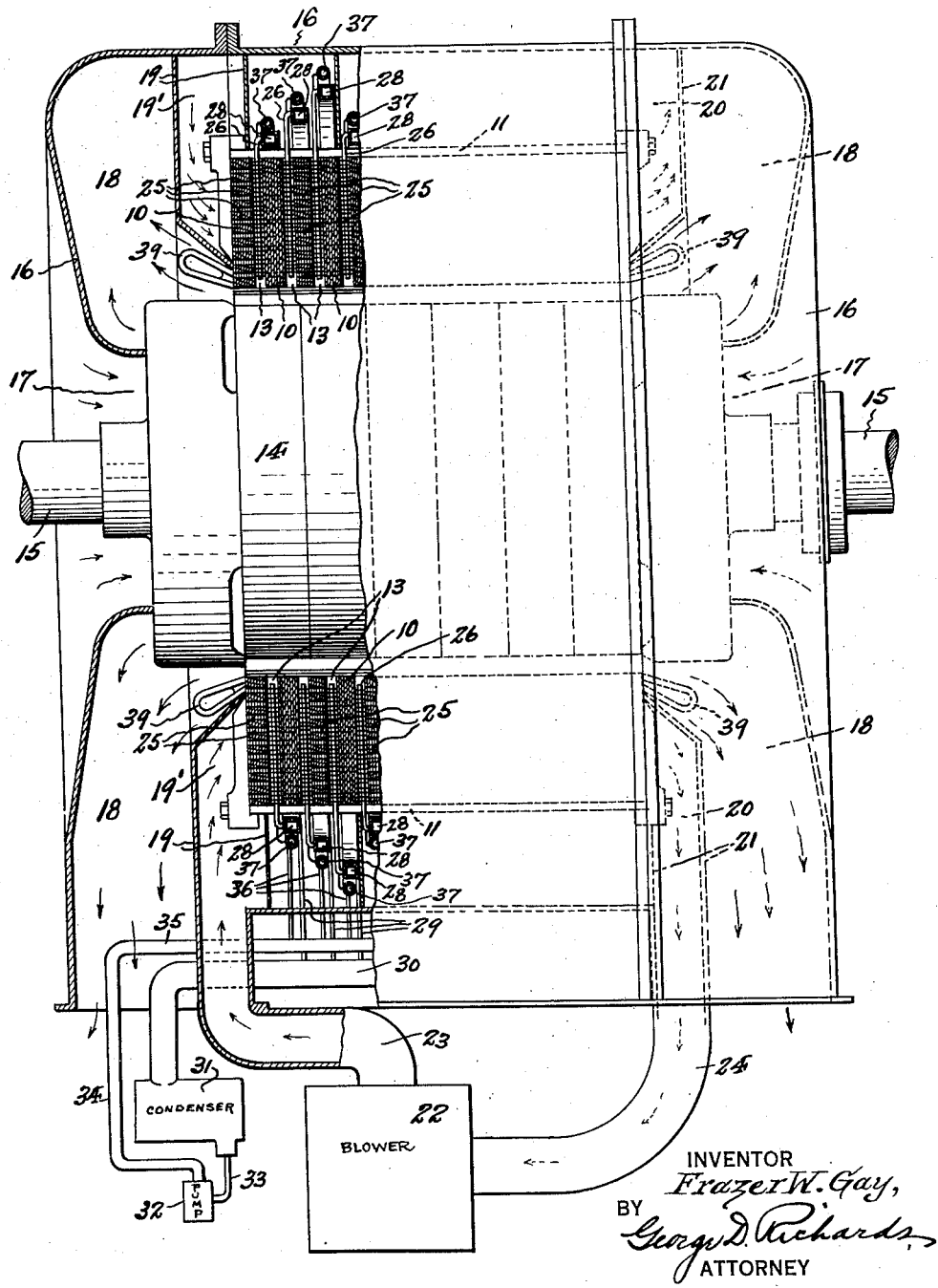

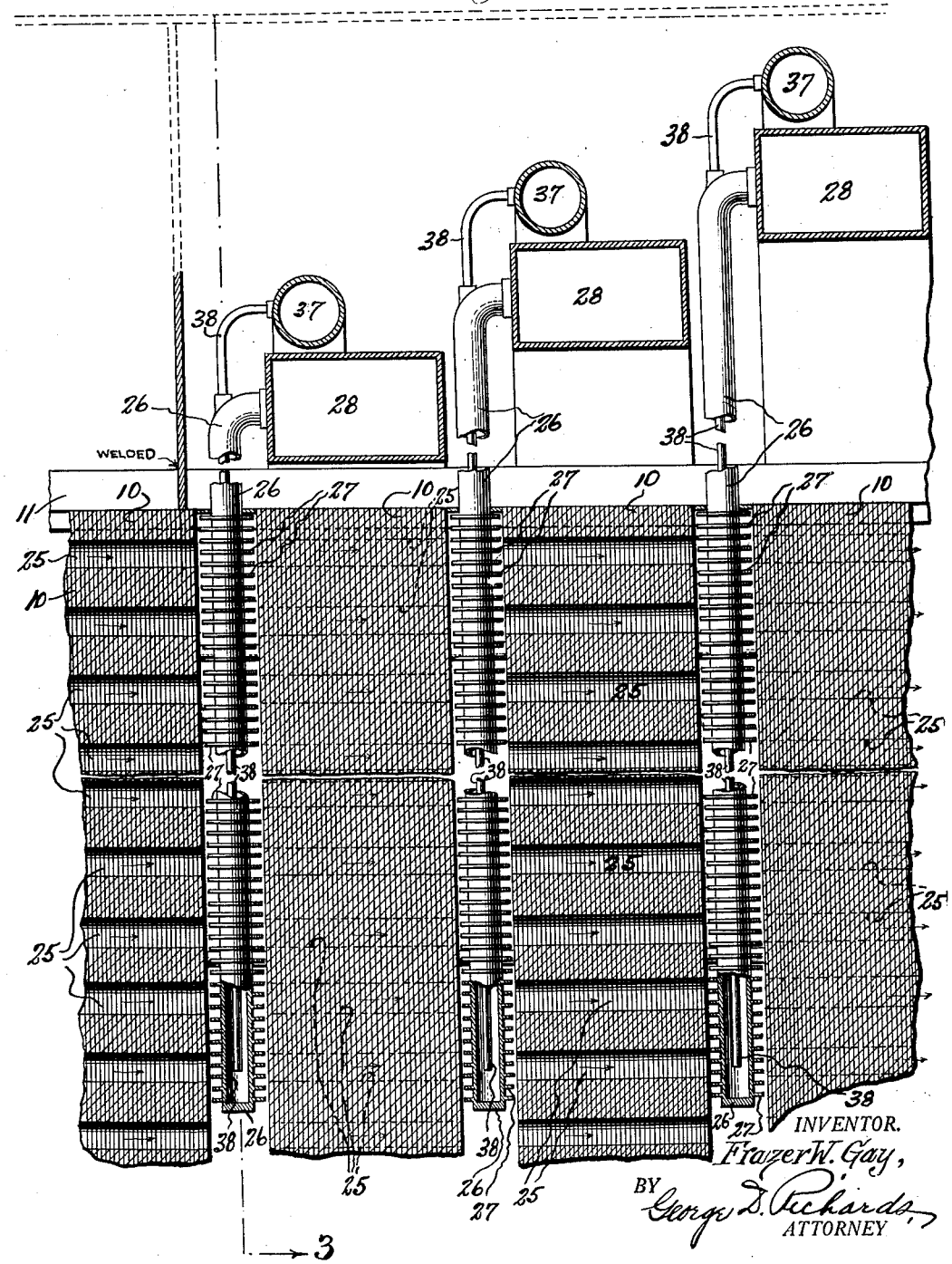

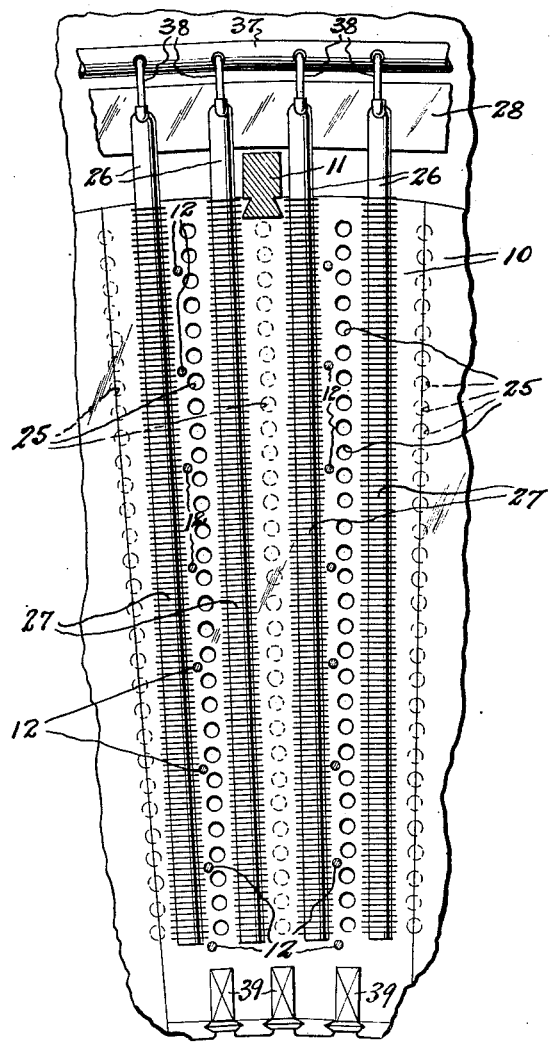

June 3, 1930.　　　　　F. W. GAY　　　　　1,761,387
HEAT TRANSFER MEANS FOR ELECTRICAL APPARATUS
Filed March 13, 1928　　　4 Sheets-Sheet 4
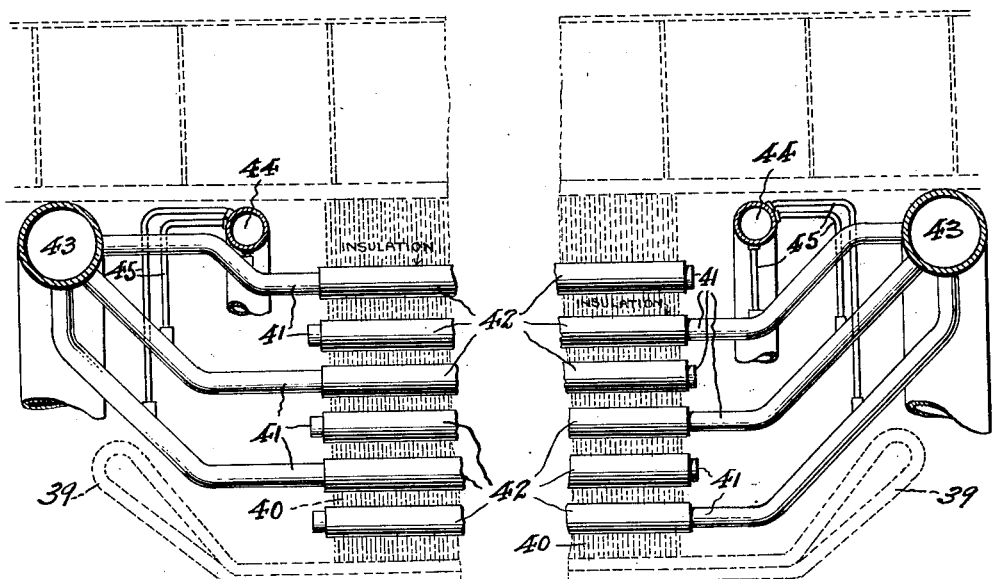
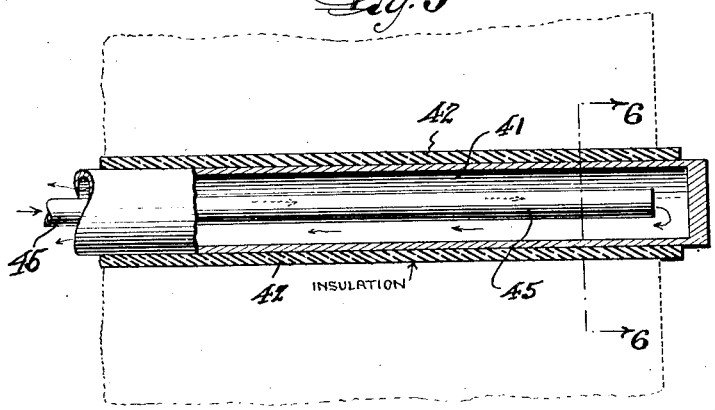
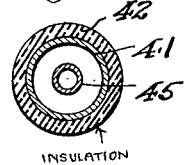
INVENTOR
*Frazer W. Gay,*
BY
*George D. Richards*
ATTORNEY Patented June 3, 1930

1,761,387

UNITED STATES PATENT OFFICE

FRAZER W. GAY, OF NEWARK, NEW JERSEY

HEAT TRANSFER MEANS FOR ELECTRICAL APPARATUS

Application filed March 13, 1928. Serial No. 261,395.

This invention relates, generally, to improvements in means for cooling electrical apparatus, especially rotating electrical machinery such as turbo generators; and the invention has reference, more particularly, to cooling or heat transfer means in combination with the stators of turbo generators.

Heretofore it has been the general practice, in the attempts which have been made to cool rotating machinery such as turbo generators, to carry off the heat desired to be removed by means of streams of air directed and circulated through the interior of the machine or apparatus. In small machines or apparatus it is relatively easy to produce the desired circulation of air therethrough, but in machines of larger size, and of large output, the length of the air passages necessary to air circulation are considerably increased, and the volume of air required to carry off the amount of heat generated is also greatly increased. Great difficulty has been experienced therefore in endeavoring to move the required large volume of air through long and restricted passages, and very high velocity movement of such air had to be induced in order to obtain effective use of air and consequent removal of heat with cooling effect. By reason of the high velocity of air movement thus required and as heretofore introduced, large windage losses occurred, and these losses have in turn tended to push up or boost the temperature of the air and have consequently reduced the efficiency of the air as a cooling medium. When machines thus air-cooled are of small size the windage losses are seldom more than a few per cent of the total losses, but in the case of modern large size machines, such as large turbo generators, these losses may be 25 per cent or more of all the losses; it has, therefore, been found that such methods of cooling are inefficient and unsatisfactory, and where used in connection with large turbo generators has allowed internal temperatures to rise so high as to permit excessive mechanical movement between copper conductors and the iron parts, due to unequal expansion and contraction of these materials, with the result that proper insulation of the conductors has been rendered both difficult and uncertain of maintenance, and insulation failures frequently arose making it necessary to discontinue service and operation of the machines while prolonged and expensive repairs were being made.

It is the object of my present invention to provide a means for cooling electrical machines such as turbo generators, for example, which is not only efficient in operation, but which avoids the objections involved in the old methods of air circulation above referred to.

With such object in view, the present invention aims to provide a cooling means comprising, principally, a series of ducts in the machine into which are introduced pipes containing a refrigerant, whereby the latent heat of evaporation of the contained refrigerant serves to carry off heat in the relatively small volume of gas resulting from such evaporation. Said volume of gas will in general be smaller or larger, as may be desired, by choosing a refrigerant calculated to possess high or low vapor pressure at the temperature of the condenser.

Furthermore, my invention contemplates the provision of means whereby parts of the apparatus or machine, not readily accessible to refrigerating pipes, may be bathed with a gas, such, for example, as air, which serves as a carrier of heat between such less accessible hot parts of the machine and the refrigerating pipes; means being provided for guiding such gas so that its path of movement from a hot spot to a refrigerating pipe is as direct as possible, generally but a few inches. My invention also proposes to recirculate the gas streams when it is desired so to do, so that such circulating gas may be repeatedly heated and cooled by coming in contact alternately with hot machine parts and then with the refrigerating pipes during a single passage from a blower to and through the machine and then back to the blower. By this latter arrangement, which is involved in my present invention, it will be evident that the circulated gas is alternately heated and cooled many times while traversing its path of circulation; that is, the gas picks up heat from hot parts and then transfers such heat to the refrigerating pipes during its progress. By such mode of operation I am able to use a much smaller volume of circulated gas, and I may also cause such circulated gas to travel at a much lower velocity than has heretofore been deemed practical.

In connection with the use of the refrigerating pipes, this invention also proposes to provide means in connection therewith whereby there will always be an excess of volatile liquid in each cooling pipe or coil, this being accomplished by permanently setting the intake of the latter and adjusting the pressure so as to admit a larger quantity of the refrigerant than can be evaporated under normal operating conditions. By this means the vapor in the coils is kept saturated and the refrigerant in passing through the cooling coils will not rise materially in temperature, but will hold very closely to pressure and hence to the temperature at which it is delivered from the condenser. A suitable condenser will be provided together with means for delivering the refrigerant therefrom to the cooling coils and connected parts.

The present invention is illustrated in the accompanying drawings, in which :—

Figure 1 shows an electrical machine in the form of a turbo generator with parts of the casing and stator structure thereof in section and illustrating in combination therewith the novel cooling or heat transfer means made according to and embodying the principles of this invention. Figure 2 is an enlarged fragmentary vertical section through a portion of the stator structure showing the application and relation thereto of the refrigerant containing coils and pipes. Figure 3 is a detail section taken on line 3—3 in Figure 2. Figure 4 is a fragmentary schematic drawing showing a modified construction and arrangement of the cooling or heat transfer means involving, however, the general principles of the present invention; Figure 5 is a fragmentary longitudinal section through one of the refrigerant circulating pipes; and Figure 6 is a detail cross section taken on line 6—6 in Figure 5.

Similar characters of reference are employed in all of the hereinabove described views to indicate corresponding parts.

In the said drawings the stator of the turbo generator (which is the type of machine taken to illustrate the application and use of the instant invention) comprises the assembly of stacks of sheet steel laminations 10, which are held together in connection with suitable supporting frames by dovetail bars 11, welded or otherwise secured to the frame. The assembly of lamination stacks are kept apart by a multiplicity of suitable spacer members 12 which extend between the same, thus providing annular spaces 13 between adjacent lamination stacks. The reference character 14 indicates the rotor of the turbo generator, the shaft 15 of which may be suitably journaled to support the rotor centrally within the field of the stator, in the manner well known to those skilled in art. The reference character 16 indicates the enclosing housing and frame work of the machine. The same being so arranged as to provide air intakes 17 at each end whereby the rotor of the machine may be cooled in the usual way by air entering the rotor near the shaft thereof and being discharged more or less laterally into the exhaust chambers 18 of the housing which have suitable discharge openings at the bottom thereof. Suitable partitions 19—19 are provided within the housing to form an annular stator cooling air intake chamber 19' which is segregated from the exhaust chamber 18 serving the rotor cooling air streams, and which is contiguous to one side or end of the stator structure. Disposed at the opposite end of the stator structure is a stator-cooling air discharge chamber 20 bounded by segregating partitions 21—21. The reference character 22 indicates any suitable form of blower mechanism, the delivery pipe 23 of which is connected in communication with the stator-cooling air intake chamber 19'. The stator-cooling air discharge chamber 20 is connected to the intake side of the blower by a return duct or passage 24.

Each annular stack of stator laminations 10 is pierced by a multiplicity of ventilating holes or passages 25. The ventilating holes or passages of one stack with respect to adjacent stacks are staggered so that the holes or passages of one stack are axially off-set with relation to the holes or passages of an adjacent stack, thus providing devious paths endwise through the stator structure for purposes to be subsequently more fully disclosed. Disposed in the annular spaces 13, intermediate the lamination stacks 10, so as to extend laterally thereinto from the outer circumferential side of the stator structure, are a plurality of cooling tubes 26, the same having substantially throughout their length a multiplicity of exterior annular fins 27 to provide a maximum of contact surface. The cooling tubes are arranged in radially disposed sets or groups disposed around the spaces 13. Each set of tubes thus respectively disposed in the annular spaces 13 intermediate the lamination stacks 10 are connected by their outer ends in communication with an exhaust conduit 28 which is substantially in the form of a header encircling the stator structure. Each exhaust conduit 28 is connected through an intermediate pipe 29 with a collector pipe 30. Said collector pipe 30 leads to any suitable form of condenser 31, which may be located exteriorly of the machine, and which is diagrammatically shown in Figure 1. Cooperating with said condenser is any suitable form of circulating pump 32, the intake end of which is connected in communication with the sump of the condenser 31 by means of a conduit 33. The discharge end of said circulating pump 32 is connected in communication with a delivery pipe 34 which leads to a distributing pipe 35 and which in turn is connected by pipes 36 with a distributing conduit 37. Said distributing conduit 37 is also substantially in the form of a header encircling the stator structure. Cooperating with each cooling tube 26 is a refrigerant feed pipe 38 of reduced diameter which leads from the distributing conduit 37 longitudinally into the cooling tube 26 so as to extend interiorly therethrough but so as to terminate adjacent to the inner closed end of the same.

In the operation of the cooling means, the construction of which has been above described, the rotor is cooled by the circulation of air sucked through the intake opening 17 by the rotation of the rotor and discharged centrifugally therefrom through the discharge chambers 18. The air thus circulated to cool the rotor also bathes and cools the ends of the coils 39 which are mounted in connection with the laminated iron sections in the manner familiar to those acquainted with electrical machines of the turbo generator type.

The operation of the apparatus utilized in cooling the stator is as follows:

A suitable refrigerant in the form of a volatile liquid is supplied to the cooling tubes 26 which lie in the annular spaces 13 intermediate the lamination stacks 10 of the stator structures. When the turbo generator is in operation, the blower 22 functions to deliver air through the pipe 23 into the air intake chamber 19' which is located at one end of the stator structure. The air thus delivered under the pressure of the blower passes through the openings 25 of the stator laminations 10 and in passing through the first laminated section takes up heat radiated therefrom. The air with the heat thus transferred thereto leaves the first section of laminations and enters the annular space 13, there coming in contact with the first series of cooling tubes 26, the fins 27 of which provide the maximum amount of contact surface exposed to such air. The heat carried in the air is transferred to the cooling tubes 26 thereby causing the refrigerant liquid within the tubes 26 to boil and thus transferring the heat conveyed by the air to the refrigerant, and consequently cooling the air before the same enters and passes through the openings of the next laminated section 10. While passing through said next section of laminations 10 the air again takes up heat radiated from the same and conveys it into the next annular space 13, so that the air is again brought into contact with the next series of cooling tubes 26 which serve to relieve the air of the heat thus collected. These operations continue right through the stator structure as will be clearly understood, and in order to assure contact of the air passing through the annular spaces 13 in which the cooling tubes 26 are located the air passages or openings 25 of adjacent sections of laminations are offset or staggered with relation to each other so that the air in leaving one section must turn and pass by in contact with the cooling pipes before it enters and passes through the next adjacent laminated section. It will thus be seen that as the air traverses the alternate laminated sections and intervening spaces it picks up the heat generated in the sections of laminations and gives up such heat to the cooling pipes. This action is alternately progressive from one end of the stator structure to the other. The air streams discharged from the last section of laminations at the opposite end of the stator structure is received in the air discharge chamber 20, from thence it is conducted through the return duct or passage 24 back to the blower and thereupon is again delivered to the air receiving chamber 19' for recirculation. While I have found that it is quite satisfactory to thus recirculate the air for the reason that the air merely serves as a heat carrying agent in transferring heat from the sections of lamination to the cooling tubes, in the broader aspects of my invention I do not wish to necessarily confine myself to such method of air circulation, and it will be understood that if it is desired I may provide means for delivering air to the intake chamber 19' for passage through the stator structure and thence for direct discharge back to the atmosphere.

It will be understood that from the above brief description that the heated air which is carried into contact with the cooling tubes 26 will cause the refrigerant content of the latter, when the heat is transferred thereto, to boil or vaporize. The vapor of the refrigerant passes out of the outer ends of the cooling tubes 26 to the exhaust conduit 28, from whence the vapor is delivered by the connecting pipes 29 to the collector pipe 30 through which the hot vapor is delivered to a suitable condenser apparatus 31. The vapor is condensed in the condenser and the resulting liquid refrigerant is discharged from the condenser by means of the pump 32 and is delivered through the pipe 34 and delivery pipe 35, whence it passes through the branches 36 into the distributing conduits 37. The distributing conduits 37 carry the liquid refrigerant to the feed pipes 38 which return the same to the interior of the cooling tubes 26. The feed pipes 38 are of considerably reduced diameter, and such pressure is maintained in the flow of liquid refrigerant from the pump to the distributing conduits 37 that an excess of volatile liquid refrigerant is forced into the closed end of each cooling tube 26. The liquid refrigerant as it enters and flows along the interior of the cooling tubes 26 volatilizes in part under the influence of the heat transferred thereto so that the pressure of the vapor thus produced greatly increases the speed of travel of the refrigerant toward and into the condenser. The internal surfaces of the cooling tubes 26 are at all times bathed and cooled by the volatile refrigerant. It will be evident that if the exhaust conduits 28 are of ample size, the temperature of the volatile refrigerant in the cooling tubes 26 cannot greatly exceed the temperature at the condenser 31 and consequently a sufficiently rapid circulation of the refrigerant is assured.

In connection with the arrangement and construction of the novel cooling apparatus in combination with the laminated sections of the stator structure it will be obvious that not only will heat generated in the latter be taken up and carried by air into the contact with the cooling tubes 26, but that also a considerable part of the heat will be radiated from the stator iron directly to the cooling tubes 26.

I find that the means and method of cooling involved in the instant invention makes it possible to carry both high flux densities in the stator iron as well as high current densities in the stator copper without danger of overheating, while at the same time minimizing likelihood of breaking down of copper insulation.

Referring now to Figures 4 to 6 inclusive of the accompanying drawings, I have shown therein a modified arrangement of cooling apparatus which involves, however, in part, the principles of the present invention. In this form of construction the laminated iron core 40 making up the stator structure is provided with a series of cooling tubes arranged to extend therethrough from one end of the stator structure to the other, and preferably in alternate annular groups entering from opposite ends of the stator structure. These cooling tubes 41 are provided with external coverings 42 of suitable insulation material. This is necessary in order to carefully insulate the cooling tubes 41 and parts connected therewith from the stator structure 40, by reason of the fact that a high voltage is generated in the tubes when so arranged. The difference in potential between the ends of that part of the cooling tubes that are imbedded in the laminated stator core structure may vary from a few volts in those tubes nearest the stator frame to many hundreds of volts in those tubes nearest the coils 39. No damage arising from the existence of this voltage will be experienced, however, provided the cooling pipes are covered with the insulation material 42 as above indicated. The respective series of cooling tubes 41 which enter at opposite ends of the stator structure are connected with exhaust conduits 43 which conduits may in turn be connected in communication with a condenser substantially in the same manner as already previously described, and likewise the delivery side of the condenser may be connected through a pump with distributing conduits 44 whereby the condensed liquid refrigerant is delivered into the cooling tubes through feed pipes 45 which enter and extend longitudinally through the cooling tubes 41 so as to terminate adjacent to the closed ends of the latter.

In the modified arrangement above described the cooling of the stator structure is effected by direct transfer of heat by conduction from the same to the cooling tubes 41 rather than by means of circulating air or other gases. The circulation of the refrigerant and its vapor through the system will be carried out, however, in substantially the same manner as has been already above described.

I am aware that many changes, other than those already referred to, may be made in the various arrangements and combinations of the devices and parts, as well as in the details of the construction of the same, without departing from the scope of this invention as set forth in the foregoing specification and as defined in the appended claims. Hence I do not limit my invention to the exact arrangements and combinations of the several devices and parts as described in the foregoing specification, nor do I confine myself to the exact details of the construction of the said parts as illustrated in the accompanying drawings.

I claim:

1. In an electrical machine having passages adapted to convey a circulating cooling fluid, a plurality of successively arranged cooler means extending into the internal parts of said machine, said cooler means being adapted to contain a refrigerant, said circulating fluid, in passing through the passages of said machine, acting to absorb heat from successive hot parts of said machine and to give up said absorbed heat to the successive cooler means, so that the temperature of said cooling fluid is alternately raised and lowered within desired limits a plurality of times during a single passage through the machine in effecting the cooling thereof.

2. In an electrical machine having passages adapted to convey a circulating cooling fluid, a plurality of successively arranged cooling tubes extending into the internal parts of said machine, said cooling tubes being adapted to contain a refrigerant, said circulating fluid, in passing through the passages of said machine, acting to absorb heat from successive hot parts of said machine and to give up said absorbed heat to the successive cooling tubes, so that the temperature of said cooling fluid is alternately raised and lowered within desired limits a plurality of times during a single passage through the machine, whereby said fluid acts as a heat transfer agent so that the successive parts of the machine are all retained at a substantially uniform temperature that is below a predetermined maximum.

3. In an electrical machine having a stator formed of a plurality of individually spaced annular stacks of laminations, cooling tubes extending into the spaces between successive stacks of laminations, said stacks of laminations having passages extending therethrough and interconnecting the spaces between said stacks, said passages being so arranged that a fluid in passing through said stator alternately passes through the passages in one of said stacks and then around a cooling tube positioned between that stack and the next succeeding stack and so on for the length of said stator, each of said successive cooling tubes acting to absorb the heat picked up by said fluid in the next preceding stack.

4. A heat transfer means for electric turbo generator stator structures to withdraw heat generated within the internal parts of the latter, comprising a system of cooling tubes containing a volatile refrigerant, said tubes having portions extending into the internal parts of said stator structure, means connected with the outer portions of said tubes to collect the vapor of the refrigerant, a condenser in communication with said collecting means to receive said vapor and condense the same, means to return the condensed refrigerant to said tubes including feed pipes of reduced diameter extending longitudinally into said tubes and terminating adjacent to the inner ends thereof to thereby maintain said inner ends at a minimum temperature and means for circulating a gaseous fluid within the stator structure alternately in contact with the hot parts thereof and said cooling tubes.

5. A heat transfer means for electric turbo generator stator structures to withdraw heat generated within the internal parts of the latter, comprising a system of successively spaced groups of cooling tubes containing a volatile refrigerant, said tubes having portions extending into the internal parts of said stator structure, means connected with the outer portions of said tubes to collect the vapor of the refrigerant, a condenser in communication with said collecting means to receive said vapor and condense the same, means to return the condensed refrigerant to said tubes including feed pipes of reduced diameter extending longitudinally into said tubes and terminating adjacent to the inner ends thereof to thereby maintain said inner ends at a minimum temperature, said stator structure having a multiplicity of passages extending therethrough and having a plurality of spaced spaces with which said passages communicate and in which said cooling tubes lie, and means to circulate a gaseous fluid through said passage and spaces alternately in contact with hot parts of said stator structure and said cooling tubes.

6. In combination, an electrical machine and cooling means therefor comprising, a stator structure having receiving spaces therein, cooling tubes projecting into said receiving spaces and containing a volatile circulating refrigerant, said stator having passages therein communicating with said receiving spaces, and blower means in communication with said passages and operating to drive a gaseous fluid alternately through said passages and said receiving spaces in which spaces said gaseous fluid passes around said cooling tubes and is cooled, said gaseous fluid in its movement through said stator structure alternately absorbing heat from said stator structure while passing through said passages and then giving up this heat to said cooling tubes while passing through said spaces to thereby retain all parts of said stator structure at a substantially uniform desired temperature.

7. In combination, an electrical machine and cooling means therefor comprising, a stator structure having receiving spaces therein, a plurality of cooling tubes projecting into said spaces, refrigerant circulating means for delivering liquid refrigerant to the inner portions of said cooling tubes to be evaporated therein and then exhausted through the outer ends of said tubes, said stator structure having passages intersecting said receiving spaces, and blower means for circulating cooling fluid alternately through said passages and said receiving spaces, said cooling fluid thereby alternately absorbing heat from portions of said stator while flowing through said passages and then giving up this absorbed heat to said cooling tubes while flowing through said receiving spaces.

8. In combination, an electrical machine and cooling means therefor comprising, a stator having a plurality of consecutively arranged sections spaced one from another to provide receiving spaces between adjacent sections, a plurality of cooling tubes projecting into said spaces and having their inner ends closed, refrigerant circulating means for delivering liquid refrigerant to the inner end portions of said cooling tubes to be evaporated within said tubes and then exhausted through the outer ends of said tubes, said sections having passages therein communicating with said receiving spaces, and blower means for circulating cooling fluid alternately through said passages and said receiving spaces, said cooling fluid alternately absorbing heat from said stator sections while flowing through said passages and then giving up this heat to said cooling tubes while flowing through said receiving spaces.

9. In combination, an electrical machine and cooling means therefor comprising, a stator having a plurality of consecutively arranged sections spaced one from another to provide receiving spaces between adjacent sections, a plurality of cooling tubes projecting into said spaces and having their inner ends closed, refrigerant circulating means for delivering liquid refrigerant to the inner end portions of said cooling tubes to be evaporated within said tubes and then exhausted through the outer ends of said tubes, said sections having passages therein communicating with said receiving spaces, the passages of any one section being staggered with respect to the passages of the next consecutive section, and blower means for circulating cooling fluid alternately through said passages and said receiving spaces, the staggering of said passages of consecutive sections acting to cause the cooling fluid to flow around the cooling tubes projecting into the receiving spaces between the sections, said cooling fluid alternately absorbing heat from said stator sections while flowing through said passages and then giving up this heat to said cooling tubes while flowing through said receiving spaces.

In testimony that I claim the invention set forth above I have hereunto set my hand this 9th day of March 1928.

FRAZER W. GAY.